US008214805B2

(12) United States Patent
Stewart (10) Patent No.: US 8,214,805 B2
(45) Date of Patent: Jul. 3, 2012

(54) METHOD AND SYSTEM FOR GRAPHICAL USER INTERFACE TESTING

(75) Inventor: James Clive Stewart, Evesham (GB)

(73) Assignee: International Business Machines Corporation, Armonk, NY (US)

( * ) Notice: Subject to any disclaimer, the term of this patent is extended or adjusted under 35 U.S.C. 154(b) by 1196 days.

(21) Appl. No.: 11/962,391

(22) Filed: Dec. 21, 2007

(65) Prior Publication Data

US 2008/0155515 A1 Jun. 26, 2008

(30) Foreign Application Priority Data

Dec. 21, 2006 (GB) .................................. 0625578.0

(51) Int. Cl.
*G06F 9/44* (2006.01)
*G06F 3/00* (2006.01)

(52) U.S. Cl. ......... 717/125; 717/124; 717/126; 715/762
(58) Field of Classification Search ........................ None
See application file for complete search history.

(56) References Cited

U.S. PATENT DOCUMENTS

| | | | |
|---|---|---|---|
| 6,378,088 B1* | 4/2002 | Mongan | 714/39 |
| 6,948,152 B2* | 9/2005 | Dubovsky | 717/124 |
| 7,191,172 B2* | 3/2007 | McGrath et al. | 707/748 |
| 7,272,753 B2* | 9/2007 | Kaplan et al. | 714/38.1 |
| 7,337,432 B2* | 2/2008 | Dathathraya et al. | 717/125 |
| 7,900,192 B2* | 3/2011 | Patterson | 717/125 |
| 7,913,231 B2* | 3/2011 | Stienhans et al. | 717/125 |
| 2004/0194065 A1* | 9/2004 | McGrath et al. | 717/124 |
| 2005/0229161 A1* | 10/2005 | Wang et al. | 717/125 |
| 2005/0257198 A1* | 11/2005 | Stienhans et al. | 717/124 |
| 2006/0005079 A1* | 1/2006 | Kaplan et al. | 714/38 |
| 2006/0143158 A1* | 6/2006 | Ruhl et al. | 707/3 |
| 2007/0061740 A1* | 3/2007 | Marini | 715/762 |
| 2008/0127103 A1* | 5/2008 | Bak | 717/126 |

FOREIGN PATENT DOCUMENTS

WO 2005071545 A3 8/2005

OTHER PUBLICATIONS

Moore, M., et al., Using Knowledge Representation to Understand Interactive Systems, IEEE, 1997, pp. 60-67, [retrieved on Feb. 13, 2012], Retrieved from the Internet: <URL:http://ieeexplore.ieee.org/>.*
WinRunner User's Guide Version 7.6, Mercury Interactive, 2003, 10 pages, [retrieved on Jul. 28, 2011], Retrieved from the Internet: <URL:http://www.cbueche.de/WinRunner%20User%20Guide.pdf>.*

(Continued)

*Primary Examiner* — Thuy Dao
*Assistant Examiner* — Geoffrey St Leger
(74) *Attorney, Agent, or Firm* — Law Office of Jim Boice (57) ABSTRACT

A method and system are provided for testing a graphical user interface (GUI). The method includes providing a pattern of a collection of generalized interface object types, searching an interface or a model of an interface for instances of collections of interface objects matching the pattern, and identifying a control provided by the interface represented by the collection of interface object types and its location in the interface hierarchy. A pattern includes a first generalized object type and a second generalized object type with a specified relative position in the interface to the first object type.

19 Claims, 5 Drawing Sheets

OTHER PUBLICATIONS

Bradley N.S., "The GUI Test Builder—Breaking the Testing Bottleneck," Computer Design, Sep. 1, 1993, pp. 71-72, 74, vol. 32, No. 9, Pennwell Publ., Littleton, MA, US.

Kanglin Li, Mengqi Wu, "Effective GUI Test Automation: Developing an Automated GUI Testing Tool," Nov. 26, 2004, Sybex Inc., 1151 Marina Village Parkway, Alameda, CA 94501, US.

Memon A. M., "A Comprehensive Framework for Testing Graphical User Interfaces," University of Pittsburgh, Jul. 26, 2001, Internet Citation: http://citeseerx.ist.psu.edu/viewdoc/summary?doi=10.1.1.24.9998.

Ostrand T. et al, "A Visual Test Development Environment for GUI Systems," Software Engineering Notes, Mar. 1, 1998, pp. 82-92, vol. 23, No. 2, ACM, New York, NY, US.

"An OO Architecture for Automated GUI Regression Tests", Software & Systems Quality Conferences, Duesseldorf, Germany (May 10-12, 2006).

"Deconstructing GUI Test Automation", STQE, www.stqemagazine.com (Jan./Feb. 2003).

GUI Test Checklist, http://www.sqatester.com/documentation/GUIchecklist.htm.

International Searching Authority, International Search Report and Written Opinion for Application No. PCT/EP2007/062050, May 29, 2008, pp. 1-14.

* cited by examiner

METHOD AND SYSTEM FOR GRAPHICAL USER INTERFACE TESTING

BACKGROUND OF THE INVENTION

This invention relates to the field of graphical user interface (GUI) testing.

Automated testing for graphical user interfaces (GUIs) is difficult because typically there is very little specification information available and GUIs are prone to repeated rapid change both during development and between software releases. Any automation of GUI based tests tends to be costly to develop and maintain, and thus marginal in cost effectiveness. Often the GUI development is gated by other components and interfaces so it is delivered late in the development cycle, limiting the testing time.

Automated GUI testing is currently done by recording steps taken by a user. These steps may include, for example, clicking links, buttons, etc. and entering data into entryfields, checkboxes, etc. Test tools record these steps, together with a record the individual elements (the "widgets") of the pages under test that were interacted with.

A GUI page has a hierarchy of widgets reflecting the nested HTML (hypertext mark-up language) tags encrypting the page content. Typically, a page will contain hundreds of elements, many of them invisible to the user, in a complex hierarchy with, for example, frames, forms, tables, documents, labels, labels containing one another, checkboxes, links, entryfields, etc.

The widget details are normally stored by a GUI test replay tool in a map which can be used to display the hierarchy of elements and to find them on the page when scripts are replayed. The map is built during the recording process and once recorded is not expected to change.

Pages under test are often generated using development tools and this makes them complex, often having many extra invisible layers of nested tables, forms, etc. It also makes them prone to change. A page may be regenerated every time the developer works on it and the order and content may change beyond recognition, as far as automation software is concerned, with each regeneration.

Whenever any pages change the test tool's map must be regenerated or maintained. Often the changes make the re-mapping very difficult, i.e. where a link is swapped for a button, where labels are swapped to be under their controls instead of visa versa, and where the invisible hierarchy of frames, forms, tables, etc. containing the controls adds or loses layers. If the map cannot be maintained, recorded test scripts fail because they do not find the required controls to click, enter data in, etc.

The fact that recording is based on recorded widgets limits testing to being based on recordings of actions. It is not possible to use test tools that create scripts using widgets without first interacting with the widgets to record them in a map. This effectively prevents testers from recording scripts until sample pages are available from development.

Maintaining large collections of test cases becomes very difficult in practice due to the problems of maintaining the mapping of widgets on the page. It is often quicker to re-record test scripts rather than to try to maintain them. Given hundreds or even thousands of test scripts, the effort involved in maintenance can become a serious limitation on GUI testing. Often GUI's tests are automated to a very limited extent because of the problems of maintenance.

SUMMARY OF THE INVENTION

According to a first aspect of the present invention there is provided a method for testing a GUI, comprising: providing a pattern of a collection of generalised interface object types; searching an interface or a model of an interface for instances of collections of interface objects matching the pattern; identifying a control provided by the interface represented by the collection of interface object types and its location in the interface hierarchy.

A pattern preferably includes: a first generalised object type; and a subsequent generalised object type with a specified relative position in the interface hierarchy to the first object type. The pattern may include one or more further subsequent generalised object types with a specified relative position in the interface hierarchy to the first object type. The interface hierarchy may be a class hierarchy or a hypertext mark-up language (HTML) tag hierarchy.

The method may include using specified properties of the interface object types in a pattern to name a control that the collection represents and specifying the type of the identified control. The location of the control in the interface hierarchy may be determined by the location of one of the object types in the pattern. The method may also include extracting data from the instances of collections of interface objects matching the pattern.

The searching through an interface or a model of an interface may be during playback of test steps, in which case, the method may include: providing a test script of test steps; creating one or more patterns of collections of generalised interface object types used in the test script; and building a list of interface object types that are included in the patterns.

Creating one or more patterns of collections may be carried out automatically by comparing object types in turn on a page of an interface with a first object type of the pattern, wherein if an object type match is found, comparing subsequent object types on the page with subsequent object types of the pattern.

The method may include: reading a test step; getting a list of interface object types that are included in the one or more patterns; searching through the interface or model of the interface for instances of interface objects types in the list; building a list of pattern instances matching the one or more patterns; and finding a pattern instance that matches the test step.

In one embodiment, the patterns may take the form of generalised interface object types in wildcarded format.

The method may include dynamically building a model of the interface in the form of a hierarchy of pattern instances.

According to a second aspect of the present invention there is provided a system for testing a GUI, comprising: a pattern of a collection of generalised interface object types; means for searching an interface or a model of an interface for instances of collections of interface objects matching the pattern; means for identifying a control provided by the interface represented by the collection of interface object types and its location in the interface hierarchy.

The system may include means for automatically creating one or more patterns of collections is carried out automatically by comparing object types in turn on a page of an interface with a first object type of the pattern, wherein if an object type match is found, comparing subsequent object types on the page with subsequent object types of the pattern.

The system may also include means for running a test script of test steps on the interface or a model of the interface.

The system may further include means for dynamically building a model of the interface in the form of a hierarchy of patterns.

According to a third aspect of the present invention there is provided a computer program product stored on a computer readable storage medium for testing a GUI, comprising computer readable program code means for performing the steps of: providing a pattern of a collection of generalised interface object types; searching an interface or a model of an interface for instances of collections of interface objects matching the pattern; identifying a control provided by the interface represented by the collection of interface object types and its location in the interface hierarchy.

BRIEF DESCRIPTION OF THE DRAWINGS

Embodiments of the present invention will now be described, by way of examples only, with reference to the accompanying drawings in which.

DESCRIPTION OF THE PREFERRED EMBODIMENTS

Figure 1:
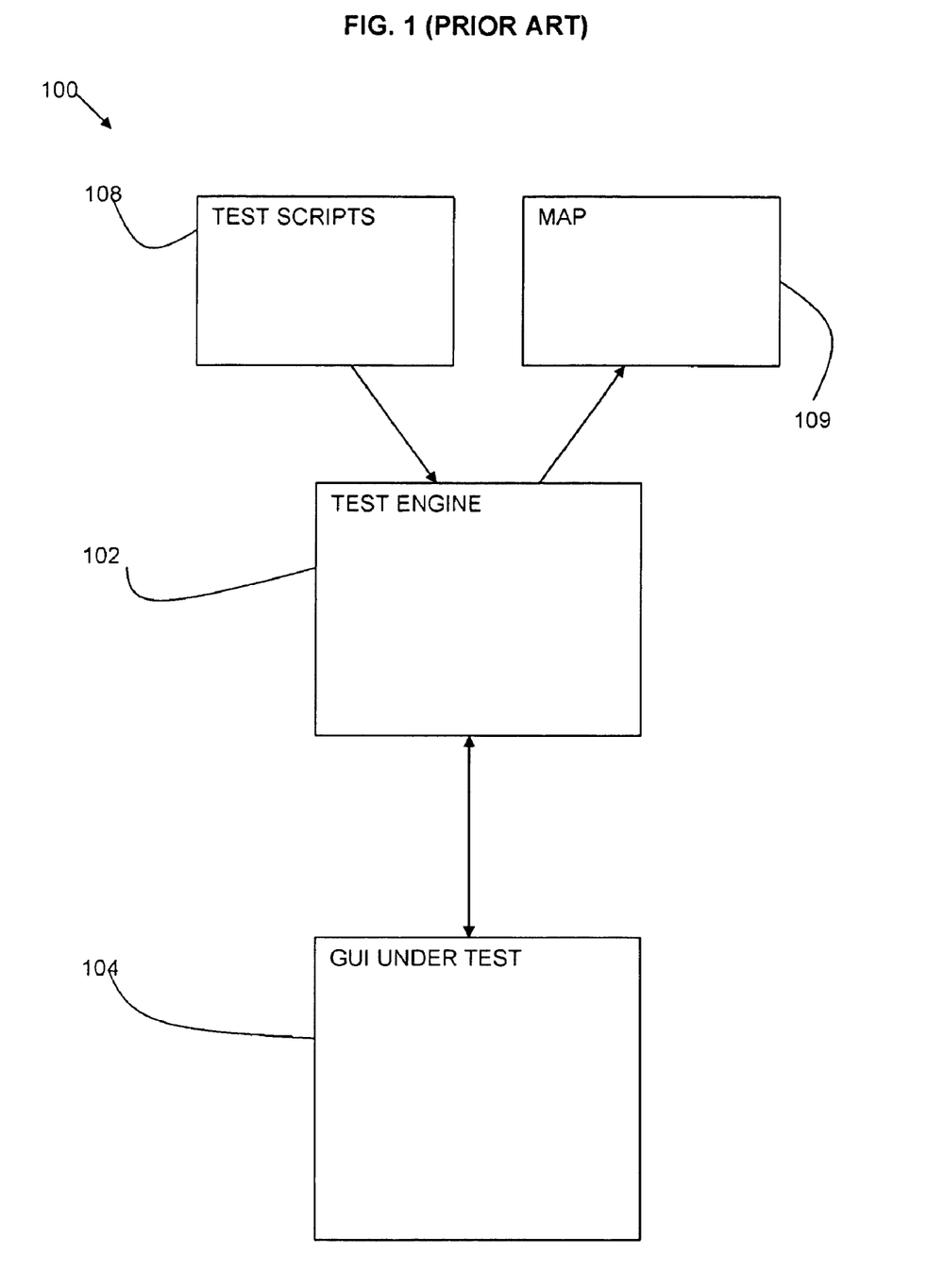
FIG. 1 is a block diagram of a GUI test system as known in the prior art.

Referring to FIG. 1, a conventional GUI testing system 100 is shown including a test engine 102 which runs tests on a GUI under test 104.

A GUI 104 usually has a plurality of pages, each page having a hierarchy of individual elements (referred to as "widgets") which can be interacted with by a user. For example, the hierarchy of widgets may include frames, forms, tables, documents, labels, nested labels, checkboxes, links, entryfields, etc.

In conventional testing, the test engine 102 runs test scripts 108 in the form of lists of GUI commands on the GUI under test 104. The GUI commands are automated commands representing steps which may be taken by a user interacting with the GUI 104. The test engine 102 records the steps taken and the widgets of the GUI pages that were interacted with.

In a conventional GUI testing system 100, a map 109 is generated and stored by the test engine 102. The map 109 displays the hierarchy of widgets in the GUI pages. The map 109 is used to find widgets on the GUI pages when test scripts 108 are run. The map 109 is designed to be a faithful record of the GUI pages' hierarchies of widgets.

A method for testing GUIs and a GUI testing system are provided in which a GUI model is built dynamically by reading the contents of GUI pages and this is used as a basis both for checking and for running tests. No prior knowledge of the GUI is required before testing can start, as the GUI model is built by inspecting the provided GUI.

Figure 2:
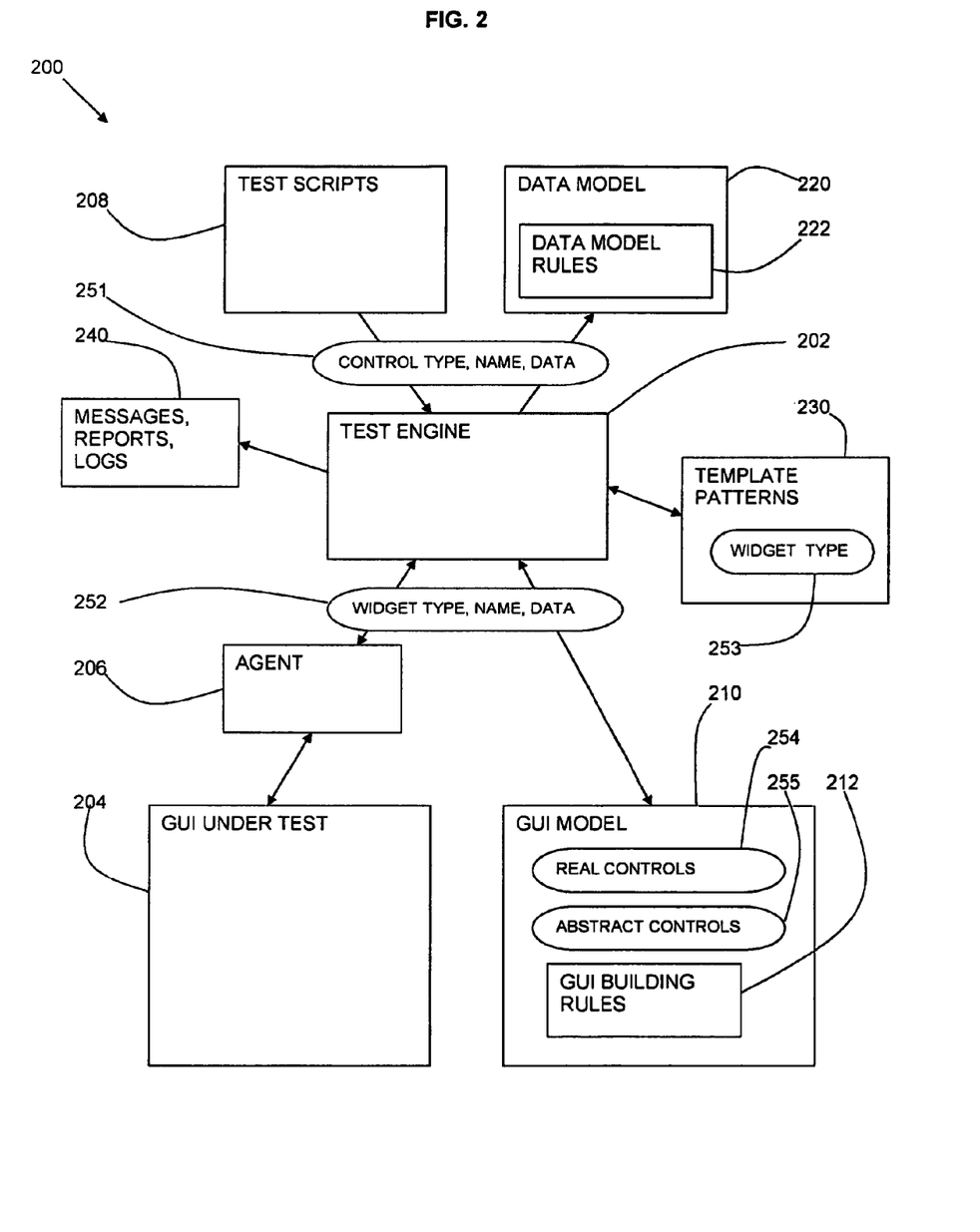
FIG. 2 is a block diagram of a GUI test system in accordance with the present invention.

Referring to FIG. 2, a test engine 202 is provided which runs tests on a GUI under test 204 via an agent 206.

A plurality of patterns 230 are developed and used by the testing system 200 which are used to identify control types, names and locations in the GUI 204 based on collections of widget types, names, and locations in the page hierarchies of the GUI 204. The collections of widget types, names, and locations are generalized in order to form the patterns 230. Relative positions of widgets (rather than absolute positions) in the page hierarchies are used to find controls.

The test engine 202 may, optionally, also dynamically build a GUI model 210 and may run tests on the GUI model 210 as well as the real GUI 204. If a GUI model 210 is present, the patterns 230 are also used by the testing system 200 to identify control types, names and locations in the GUI model 210 as well as the real GUI 204.

The GUI model 210 is created and updated dynamically using the patterns 230. The GUI model 210 includes GUI building rules 212 which are executed if a test is applied to a control which is not present in the GUI model 210.

The GUI model 210 is a model of the discovered contents of the pages of the GUI 204 under test. The GUI model 210 may consist, for example, of just a list of discovered controls.

The GUI model 210 may include internal model(s) or list(s) of data for both the real GUI 204 and derived or inferred controls. Thus, the GUI model 210 contains both the controls found on the page and "virtual" controls which are not actually part of the page but which are a useful representation of controls.

For example, the page might contain a label and an entryfield widget. This would be modelled as a labelled entryfield using the name from the label and the control which is the entryfield widget. This labelled entryfield is not a real element of the page but is useful for referring to the elements of the page being worked with.

As in conventional testing, the test engine 202 runs test scripts 208 in the form of lists of GUI commands on the GUI under test 204. Additionally or alternatively, a model-based testing may be carried out.

A data model 220 can be built manually (separate from the GUI model) in the form of an abstract model of the data and objects being handled by the GUI 204. Model-based testing can use data model rules 222 which are random actions such as create, update, delete, etc. which result in expected outcomes in the data model 220. The rules are sequences of instructions for test steps which are randomly selected during testing. They are used to exercise scenarios and test aspect of the behaviour, as in traditional non-GUI model based testing.

Thus, both the GUI model 210 and the data model 220 may be in use during testing of a GUI 204. The GUI model 210 is used to unravel the page contents and to find controls on the page, and the data model 220 is used to decide what data is available and what can be done with the things it represents.

Alternatively, the test system 200 may use model-based testing with a data model 220 and data model rules 222 using the patterns 230 without building a GUI model 210.

The test engine 202 generates messages, reports, logs, etc. of the tests run on the GUI 204 and the GUI model 210.

The test scripts 208 and data model rules 222 run commands in the form of controls 251 specifying the type, name and location of the controls plus associated data or actions to apply to the control. The patterns 230 are in the form of generalized widget types 253 which are applied by the test engine 202 to the GUI 204 and the GUI model 210. The GUI 204 and the GUI model 210 return widget instances 252. The GUI model 210 stores real controls 254 and abstract or virtual controls 255.

The use of either test scripts 208 or data model rules 222 is dependent on the test system 200 and whether it uses a data model 220 to model user interactions. The test scripts 208 and data model rules 222 are interchangeable for testing except that data model rules 222 are a more flexible and powerful way of driving GUI tests.

The actions a normal user is aware of in a GUI all involve working with collections of controls. These may be simply labels containing entryfields etc. or these may be more complex collections of several controls, as in a table row containing a checkbox and a hyperlink.

Conventional test tools normally record their maps in terms of the underlying widgets which may have names which make no sense to the user. They normally use combinations of properties from the entire page hierarchy to find the control during replay. This makes the detection of the control in question sensitive to small changes in other components of the page.

If a GUI model is used and it only operates in terms of the individual controls and fields it is not possible to detect or predict effects which may span many controls. If this is true, the model may fail when some controls appear or disappear as part of a collection (for example, when a table row is deleted), and the model does not expect this behaviour.

By automatically identifying nested collections of controls on a panel it is possible to make the GUI model accurately represent GUI actions for objects represented by control collections.

By identifying any repeated sequences and any specified patterns of object types in the hierarchy of controls on a GUI model, it is possible to recognise control collections. Collections typically span a single page although it is possible to recognise patterns across the entire GUI model. This has an advantage where there is only a single example of the collection on one page but there are multiple examples elsewhere in the GUI.

Patterns may be used without building a GUI model. In this case, the testcase command specifies a control type and name. The patterns which produce a result of that type are all be tried and the names of the resulting "virtual" controls are compared with the testcase command. When a matching control is found this is used to execute the command. It is also possible to build a simple list of "virtual" controls of the required type and to search the list for the required name. This is not a complete model of the GUI but represents the simplest partial model that can be practically used.

Having recognised a pattern, that pattern may be stored in a wildcarded form, where specific properties such as labels and names are ignored and the minimum information required to recognise the controls is stored.

If the stored wildcarded patterns are editable, they can be modified to specify the type and property specifying the name in order to name specific collections or actions and to add any patterns which are not automatically detected. The wildcarded patterns are then used to derive instances of the collection whenever new controls (widgets) are added to the GUI model.

Similar patterns of controls may be used repeatedly throughout a GUI's pages. The most typical example is a labelled field consisting of a label containing an entryfield. Using a pattern, it is possible to describe an entryfield inside a label. On running a test or a data model rule, it is possible to find all examples of these "collection-controls" on a page. By selecting the example where the label matches the name of the field in which data is to be entered, a script can be replayed. The same pattern can be used on all pages where similarly labelled entryfields are found, with a variety of different label names.

It is possible in many cases to find the patterns automatically by comparing structures found on the page and finding the shortest matching patterns. This is done by working down a page hierarchy through elements such as tables, documents, etc. until an element is found that is repeated and any elements that match the pattern.

For example, a search is made down the class hierarchy of a page and when a label is found, a sub-search is started from that point for another label. Having found two labels, a search is made under each label and if a matching type of widget is found, then a pattern has been found. The naming element of the pattern can be assumed to be any label element found in the pattern. The other properties that change between instances of the pattern, can be generalized by wildcards. Once a pattern is found in this way it can be reused in other pages in the same way as manually derived patterns.

If there are multiple types of labelled entryfield on a collection of pages, it is easy to add patterns to suit. For example, there may be some cases with entryfields under labels in the page hierarchy and some where the label is under the entryfield. Two patterns label-entryfield and entryfield-label can detect all cases. If the two patterns are both detected and interacted with as if they were an entryfield named after the label the test scripts are protected against changes.

Ideally widget recognition should produce unique results during playback. Using patterns this is not guaranteed because the pattern may be matched in several places on a page. In practice, a test tool can usually run tests successfully by using the first match from a list and logging the fact that a problem occurred. For example, if trying to click a hyperlink, multiple identically named hyperlinks on the page are probably all valid to use. In the case of a page with several frames containing and element, for example, a button marked 'OK', the frame can be specified as part of the pattern, or the combination of pattern and frame can be selected from the GUI model.

Using patterns, test scripts and data model rules can be written in terms of more general user like constructs. The user typically sees the label text next to the relevant entryfield so it is logical to specify the entryfield by this name when writing a test script. For example, to enter data in a field labelled 'Description' a typical example script line is:

entryfield, Description, This is the description to enter

Thus by matching patterns telling which control types and how they are related it is possible for the test tool to work in terms that are clear to the user.

References to the individual label and field elements do not need to be stored, only the patterns of elements.

The patterns are easily maintainable in two ways:
1. They are immune to changes outside of the pattern, i.e. a labelled entryfield may be unchanged despite being inside a new table or a different document from the previous release of the software.
2. It is easy to add a new pattern when there are new or different arrangements of controls. For instance, if all labelled entryfields consist of a label containing an entryfield and the new version has the entryfield containing the label. Adding a new pattern allows test scripts or the model data rules to continue to run unchanged. If there are a mixture of types in a GUI, testing continues using both patterns, discovering each pattern where it applies.

Figure 3:
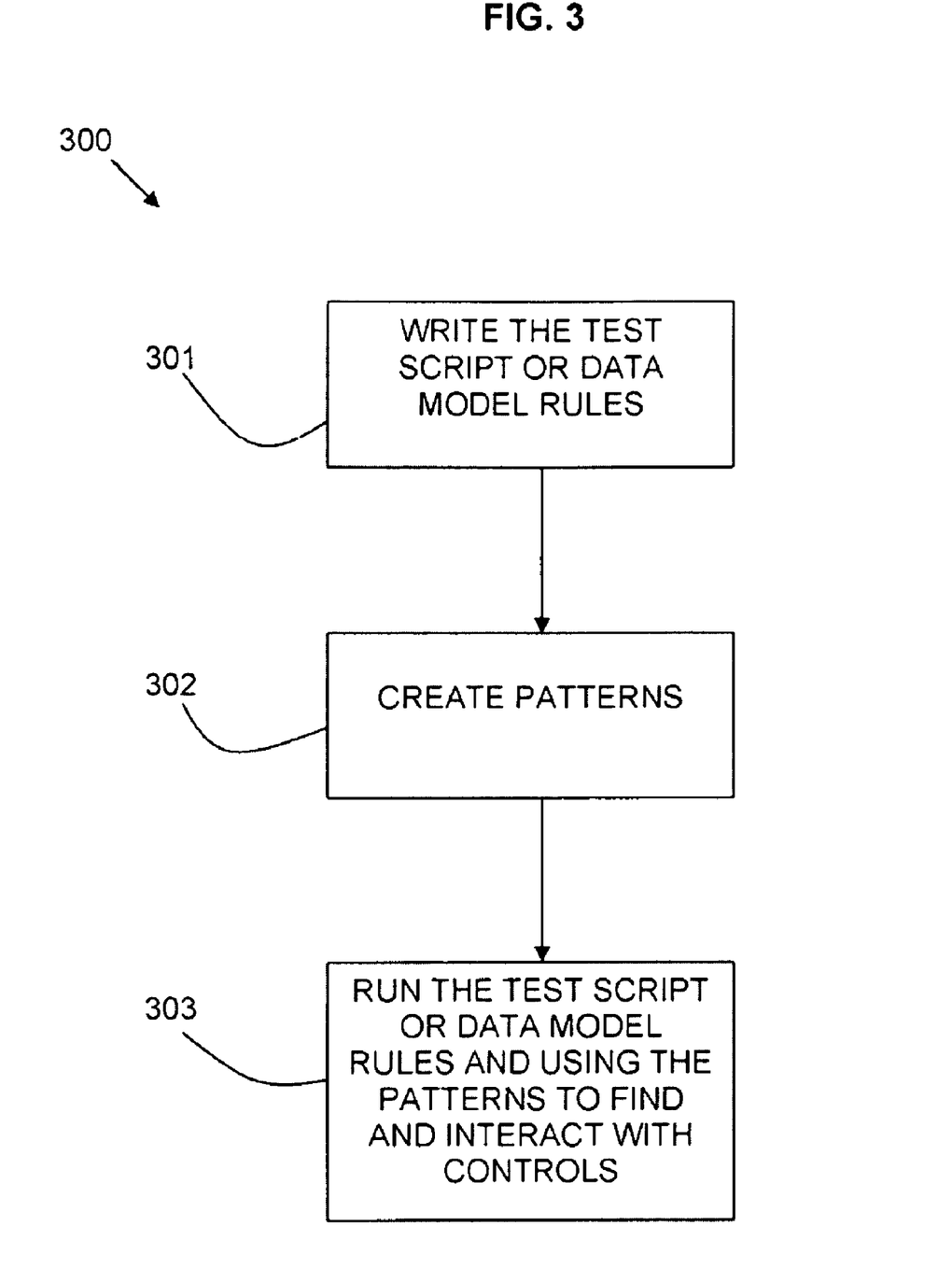
FIG. 3 is a flow diagram of an overall method in accordance with the present invention.

FIG. 3 is a flow diagram of the general method 300 of using patterns to test GUI interfaces. The stages in using patterns for GUI testing are to write the test script or data model rule 301, to create the patterns 302, and then to run the script or data model rule 303 and use the patterns to find and interact with the controls.

Stage 1—Write the Test Script or Data Model Rules:

The user writes the scripts in a suitable descriptive language. A typical example is:

twist, Service Documents, WSDL Documents
link, basic.wsdl
entryfield, Description, new description
entryfield, Version, test v1.0
button, OK This example script will:
 Navigate via a twist 'Service Documents', and a link 'WSDL Documents'
 Open a hyperlink 'basic.wsdl'

Enter data into fields called 'Description', and 'Version' Click the OK button.

The script is written in terms of labelled controls, which look like the contents of the page as seen by the user, rather than the contents of the HTML tags as seen by a test tool.

Stage 2—Create the Patterns:

By inspecting the HTML tags, a display or printout of the elements on the page, or the map used in a test tool, it can be decided what patterns are required. An example printout of a page contents is

```
(formType, DetailForm,   17_2_0_6_0_2_4_0_0)
    (tableType, General Properties Name ... 17_2_0_6_0_2_4_0_0_3)
        (labelType, Name,   17_2_0_6_0_2_4_0_0_3_1_0)
        (entryField (entryfieldType), nameField, , basic.wsdl 17_2_0_6_0_2_4_0_0_3_1_1)
        (labelType, Description,   17_2_0_6_0_2_4_0_0_3_1_4)
        (entryField (entryfieldType), descriptionField, ,   17_2_0_6_0_2_4_0_0_3_1_5)
    (button (buttonType), OK,   17_2_0_6_0_2_4_0_0_5)
```

In this example, each line represents a control on a page (and also an HTML tag in the page source). Indentation shows the way items are nested. The numbers at the end of each line show how items are ordered within the nesting.

The HTML source for the description field and it's label is:

```
<label for="descriptionField" title="The description of the document or object.">
    Description
</label>
<input type="text" name="flattenedProperties[2].value" value=""
style="margin-bottom:1em" class="textEntry"
id="descriptionField" title="Description" size="45"/>
```

Figure 4:
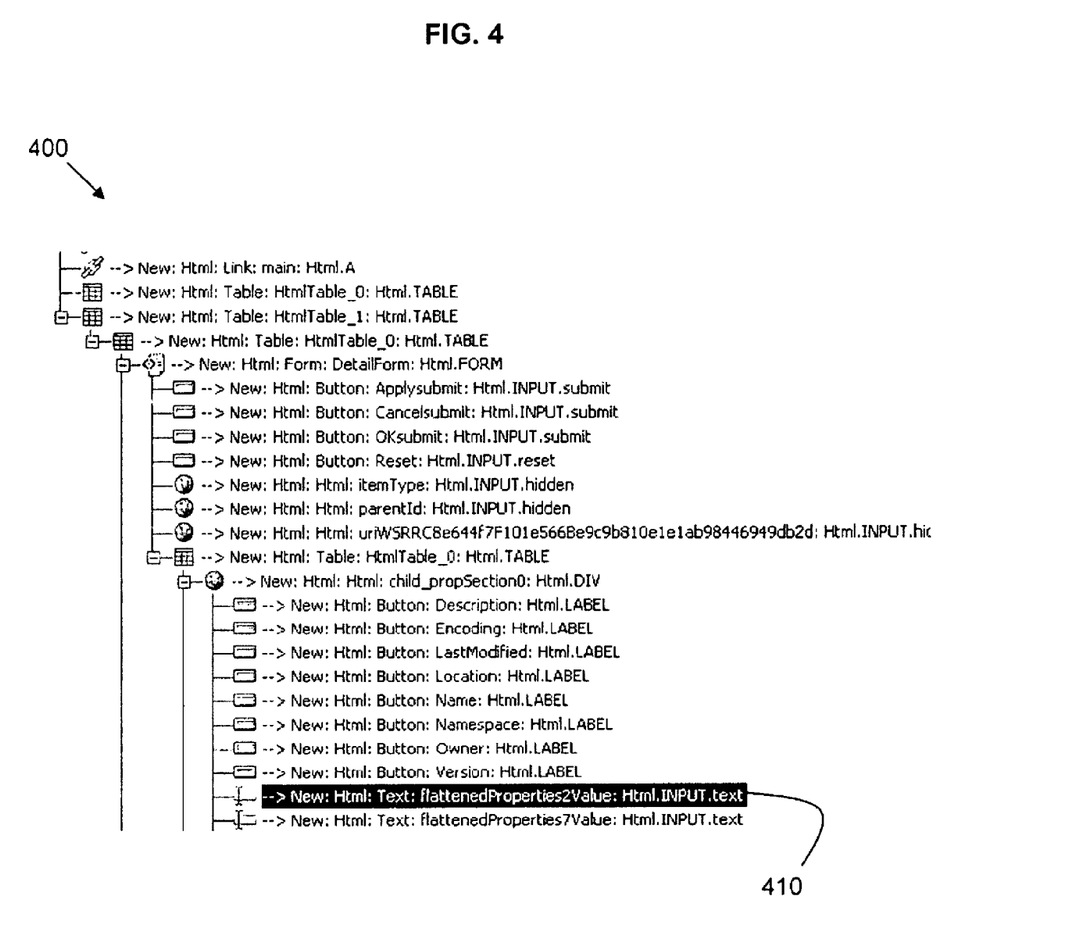
FIG. 4 is an extract of a representation of an HTML source for a description filed and its label.

FIG. 4 shows an extract of a representation of the HTML source 400 for the description field and its label 410.

An example code for a pattern for one type of entryfield is:
('8 Labelled Entryfield', None),
(labelType, '*', '+', [name]),
(entryfieldType, '*', '+1', [location,controlType])

This pattern consists of a first line naming the pattern:
('8 Labelled Entryfield', None), The second line describes the first control to look for:
(labelType, '*', '*', [name]), This specifies a label with wildcard symbols implying any name and any location. The item '[name]' specifies that this element is used to supply the name for the 'collection-control'.

The third line specifies that an entryfield with unspecified name should be 'under' the label. The [location,controlType] specifies that the location to enter the data and the type of the control this pattern represents should be taken from this entryfield.

Stage 3—Run the Script or Data Model Rules:

To run a script the test tool should read all supplied patterns and build a list of all widget types that are included in the patterns.

Figure 5:
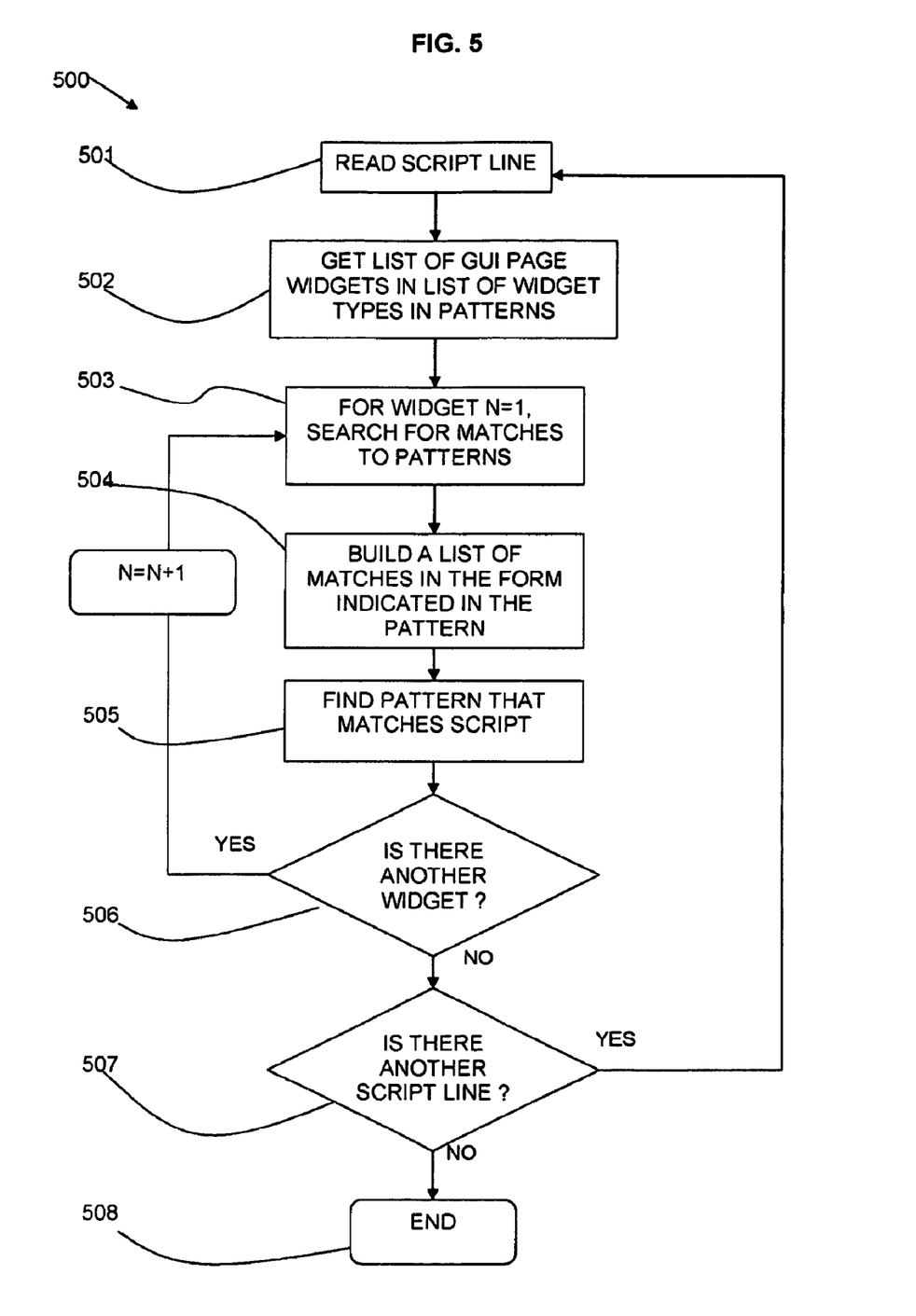
FIG. 5 is a flow diagram of a detailed method in accordance with the present invention.

FIG. 5 shows a flow diagram 500 of the method steps of running a script or data model rule. The method reads a script line 501 (i.e. entryfield, Description, new description), and gets a list of all GUI page widgets that are in the list of widget types in patterns 502.

For a widget n=1, search for matches to the patterns 503. Build a list of matches in the form (type, name, location) as indicated in the pattern 504. Find the pattern where the type and name match those in the script (i.e. entryfield, Description) 505. It is then determined 506 if there is another widget in the list and if so, the method loops to step 503 and iterates to widget n=n+1.

If there are no more widgets, it is determined if there are more lines in the script 507, if so, the method loops to step 501 for the next line of the script. If there are no more lines of the script, the method ends 508.

The patterns or collections of controls should be dynamically detected while tests run. Once a sufficient collection of patterns have been built up tests have a good chance of continuing to run despite changes to the GUI under test. Any patterns that are not detected in the pages under test cause no problems.

The patterns can be built up in a hierarchy of more abstract levels. Thus a complete page might be recognised as representing a data entry page to create a new record if it contains entryfields etc. and a button called 'Add', or a page might be recognised as a navigation frame because it contains 'twists' (icons to expand or collapse lists of links) and links. Once working at this level of abstraction, general purpose models can be written and test scripts may be applied to a large number of pages or products.

It can be useful to print or display the 'collection-controls' alongside the raw widgets so that the user can debug scripts which fail. It is also useful to use only the 'collection-controls' for comparing page contents because they are more protected against change.

An advantage of this pattern approach is that maintenance is far simpler, consisting of simply maintaining or adding patterns, which are far shorter and simpler than maps of the entire or partial page contents. In addition, patterns can be reused between builds, releases and projects. For example, the pattern for a labelled entryfield can be applied to entryfields on many different GUI pages. Scripts and model rules can be written early, possibly before the GUI is created. Scripts and model rules can be made general purpose and can apply to many similar pages and projects.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A processor-implemented method for testing a graphical user interface (GUI), comprising:
  a processor providing a pattern of a collection of generalized graphical user interface object types, wherein the pattern of the collection of generalized graphical user interface object types comprises a nested collection of controls that performs a specific type of GUI-based action;
  the processor labeling the nested collection of controls with a combination of control names for each control from the nested collection of controls located in a GUI model, wherein the nested collection of controls is named in accordance with both a hierarchical order and a non-hierarchical order of the nested collection of controls as ordered within a page hierarchy of a real GUI, and wherein the GUI model is a model of both a discovered real singular control from the real GUI as well as virtual controls that represent controls not present on said GUI page;
  the processor searching the GUI model of the real GUI for instances of collections of interface objects matching the pattern, wherein instances of the collections of interface objects are identified by known collections of the real singular control and the virtual controls from the GUI model;
  the processor providing a test script of test steps, wherein the test script runs commands that follow a form of controls from the GUI model;
  the processor providing data model rules that describe actions applied to the GUI model, wherein the actions result in expected outcomes;
  the processor providing a data model for the GUI model, wherein the data model is an abstract model of data and objects being handled according to the data model rules; and
  the processor selectively applying the test script or the data model rules to test identified instances of the collections of interface objects from the GUI model based on whether a test system for the GUI model utilizes the data model to model user interactions with the GUI, wherein the data model rules are applied if the GUI model utilizes the data model, and wherein the test script is applied if the GUI model does not utilize the data model.

2. The processor-implemented method as claimed in claim 1, wherein the pattern comprises:
  a first generalized object type; and
  a subsequent generalized object type with a specified relative position in an interface hierarchy to the first generalized object type.

3. The processor-implemented method as claimed in claim 2, wherein the pattern comprises one or more further subsequent generalized object types with a specified relative position in the interface hierarchy to the first generalized object type.

4. The processor-implemented method as claimed in claim 3, wherein the patterns are formed of generalized interface object types in wildcarded format.

5. The processor-implemented method as claimed in claim 1, further comprising:
  the processor creating one or more patterns of collections of generalized graphical user interface object types used in the test script; and
  the processor building a list of interface object types that are included in the patterns of collections of generalized interface object types used in the test script.

6. The processor-implemented method as claimed in claim 5, wherein creating one or more patterns of collections is carried out automatically by comparing object types in turn on a page of an interface with a first object type of the pattern, wherein if an object type match is found, comparing subsequent object types on the page with subsequent object types of the pattern.

7. The processor-implemented method as claimed in claim 5, further comprising:
  the processor reading a test step;
  the processor getting a list of interface object types that are included in the one or more patterns;
  the processor searching through the interface or model of the interface for instances of interface object types in the list;
  the processor building a list of pattern instances matching the one or more patterns; and
  the processor finding a pattern instance that matches the test step.

8. A computer-readable storage device embodying computer program code for testing a graphical user interface (GUI), the computer program code comprising computer executable instructions configured for:
  providing a pattern of a collection of generalized graphical user interface object types, wherein the pattern of the collection of generalized graphical user interface object types comprises a nested collection of controls that performs a specific type of GUI-based action;
  labeling the nested collection of controls with a combination of control names for each control from the nested collection of controls located in a GUI model, wherein the nested collection of controls is named in accordance with both a hierarchical order and a non-hierarchical order of the nested collection of controls as ordered within a page hierarchy of a real GUI, and wherein the GUI model is a model of both a discovered real singular control from the real GUI as well as virtual controls that represent controls not present on said GUI page;
  searching the GUI model of the real GUI for instances of collections of interface objects matching the pattern, wherein instances of the collections of interface objects are identified by known collections of the real singular control and the virtual controls from the GUI model;
  providing a test script of test steps, wherein the test script runs commands that follow a form of controls from the GUI model;
  providing data model rules that describe actions applied to the GUI model, wherein the actions result in expected outcomes;
  providing a data model for the GUI model, wherein the data model is an abstract model of data and objects being handled according to the data model rules; and
  selectively applying the test script or the data model rules to test identified instances of the collections of interface objects from the GUI model based on whether a test system for the GUI model utilizes the data model to model user interactions with the GUI, wherein the data model rules are applied if the GUI model utilizes the data model, and wherein the test script is applied if the GUI model does not utilize the data model.

9. The computer-readable storage device of claim 8, wherein the pattern comprises:
a first generalized object type; and
a subsequent generalized object type with a specified relative position in an interface hierarchy to the first generalized object type.

10. The computer-readable storage device of claim 9, wherein the pattern comprises one or more further subsequent generalized object types with a specified relative position in the interface hierarchy to the first generalized object type.

11. The computer-readable storage device of claim 10, wherein the patterns are formed of generalized interface object types in wildcarded format.

12. The computer-readable storage device of claim 8, wherein the embodied computer program code further comprises computer executable instructions configured for:
creating one or more patterns of collections of generalized interface object types used in the test script; and
building a list of interface object types that are included in the patterns of collections of generalized interface object types used in the test script.

13. The computer-readable storage device of claim 12, wherein creating one or more patterns of collections is carried out automatically by comparing object types in turn on a page of an interface with a first object type of the pattern, wherein if an object type match is found, comparing subsequent object types on the page with subsequent object types of the pattern.

14. The computer-readable storage device of claim 12, wherein the embodied computer program code further comprises computer executable instructions configured for:
reading a test step;
getting a list of interface object types that are included in the one or more patterns;
searching through the interface or model of the interface for instances of interface object types in the list;
building a list of pattern instances matching the one or more patterns; and
finding a pattern instance that matches the test step.

15. A system for testing a graphical user interface (GUI), comprising:
hardware means for providing a pattern of a collection of generalized graphical user interface object types, wherein the pattern of the collection of generalized graphical user interface object types comprises a nested collection of controls that performs a specific type of GUI-based action;
hardware means for labeling the nested collection of controls with a combination of control names for each control from the nested collection of controls located in a GUI model, wherein the nested collection of controls is named in accordance with both a hierarchical order and a non-hierarchical order of the nested collection of controls as ordered within a page hierarchy of a real GUI, and wherein the GUI model is a model of both a discovered real singular control from the real GUI as well as virtual controls that represent controls not present on said GUI page;
hardware means for searching the GUI model of the real GUI for instances of collections of interface objects matching the pattern, wherein instances of the collections of interface objects are identified by known collections of the real singular control and the virtual controls from the GUI model;
hardware means for providing a test script of test steps, wherein the test script runs commands that follow a form of controls from the GUI model;
hardware means for providing data model rules that describe actions applied to the GUI model, wherein the actions result in expected outcomes;
hardware means for providing a data model for the GUI model, wherein the data model is an abstract model of data and objects being handled according to the data model rules; and
hardware means for selectively applying the test script or the data model rules to test identified instances of the collections of interface objects from the GUI model based on whether a test system for the GUI model utilizes the data model to model user interactions with the GUI, wherein the data model rules are applied if the GUI model utilizes the data model, and wherein the test script is applied if the GUI model does not utilize the data model.

16. The system as claimed in claim 15, further comprising;
hardware means for automatically creating one or more patterns of collections carried out automatically by comparing object types in turn on a page of an interface with a first object type of the pattern, wherein if an object type match is found, comparing subsequent object types on the page with subsequent object types of the pattern.

17. The system as claimed in claim 15, further comprising:
hardware means for running the test script of test steps on the interface or a model of the graphical user interface.

18. The system as claimed in claim 17, wherein the test script is formed of randomly selected data model rules emulating the actions of a user.

19. The system as claimed in claim 15, further comprising:
hardware means for dynamically building a model of the graphical user interface in the form of a hierarchy of patterns.

* * * * *